United States Patent
Stock et al.

(10) Patent No.: US 9,121,416 B2
(45) Date of Patent: Sep. 1, 2015

(54) VARIABLE SPEED AIR BLOWING SYSTEM

(75) Inventors: Darrell A. Stock, Huntersville, NC (US); Scott E. Miller, Minneapolis, MN (US)

(73) Assignee: INGERSOLL-RAND COMPANY, Davidson, NC (US)

( * ) Notice: Subject to any disclaimer, the term of this patent is extended or adjusted under 35 U.S.C. 154(b) by 2545 days.

(21) Appl. No.: 11/531,299

(22) Filed: Sep. 13, 2006

(65) Prior Publication Data

US 2007/0110606 A1 May 17, 2007

Related U.S. Application Data

(60) Provisional application No. 60/716,768, filed on Sep. 13, 2005.

(51) Int. Cl.
| | | |
|---|---|---|
| *F04D 25/08* | (2006.01) | |
| *F04D 29/58* | (2006.01) | |
| *F04D 27/00* | (2006.01) | |

(52) U.S. Cl.
CPC .............. *F04D 29/582* (2013.01); *F04D 25/08* (2013.01); *F04D 27/004* (2013.01)

(58) Field of Classification Search
CPC ................. F01P 7/00; F01P 7/02; F01P 7/16; F04D 29/582; F04D 25/08; F04D 27/004; F04D 27/0253
USPC .............................. 62/180, 182, 186; 165/140
See application file for complete search history.

(56) References Cited

U.S. PATENT DOCUMENTS

| | | | | |
|---|---|---|---|---|
| 1,700,840 A | * | 2/1929 | Gay ................................. | 310/52 |
| 1,769,220 A | * | 7/1930 | Gow ................................. | 432/24 |
| 1,925,805 A | * | 9/1933 | Holle ............................... | 165/140 |
| 1,996,870 A | * | 4/1935 | Kratky et al. .................... | 62/283 |
| 2,110,693 A | * | 3/1938 | Bailey ............................. | 165/232 |
| 2,145,775 A | * | 1/1939 | Muffly ............................. | 62/73 |
| 2,233,633 A | * | 3/1941 | Mollenberg .................... | 62/178 |
| 2,451,903 A | * | 10/1948 | Bauman .......................... | 62/177 |
| 2,502,204 A | * | 3/1950 | Cole ............................... | 266/254 |
| 2,787,128 A | * | 4/1957 | Brown ............................. | 62/90 |

(Continued)

FOREIGN PATENT DOCUMENTS

| | | |
|---|---|---|
| FR | 2503279 | 10/1982 |
| GB | 2264355 | 8/1993 |
| WO | WO 2005/068847 | 7/2005 |

OTHER PUBLICATIONS

Oxford English Dictionary, Online Edition definition of motor printed Dec. 2, 2009 http://dictionary.oed.com/cgi/entry/00316524?query_type=word&queryword=motor&first=1&max_to_show=10&sort_type=alpha&result_place=1&search_id=rYli-WMdd0x-6157&hilite=00316524.*

(Continued)

*Primary Examiner* — Ljiljana Ciric
*Assistant Examiner* — Alexis Cox
(74) *Attorney, Agent, or Firm* — Taft Stettinius & Hollister LLP

(57) ABSTRACT

A fluid compression system includes a compressor unit that directs a flow of compressed fluid to a first heat exchanger. A second heat exchanger receives a flow of coolant. A blower produces a flow of ambient air that passes through the first heat exchanger and the second heat exchanger so as to direct cooling air through both heat exchangers. A variable speed motor is coupled to the motor in addition to a control system to vary the motor speed between a low speed and a high speed.

21 Claims, 6 Drawing Sheets

(56) References Cited

U.S. PATENT DOCUMENTS

| | | | | |
|---|---|---|---|---|
| 2,898,484 | A | * | 8/1959 | Krastchew .................. 310/52 |
| 3,222,555 | A | * | 12/1965 | Snoberger et al. ............ 62/505 |
| 3,362,185 | A | * | 1/1968 | Harnish ........................ 62/201 |
| 3,506,065 | A | * | 4/1970 | Kulling et al. ................ 165/65 |
| 3,618,337 | A | * | 11/1971 | Mount ........................... 62/505 |
| 4,242,878 | A | | 1/1981 | Brinkerhoff |
| 4,244,193 | A | * | 1/1981 | Haakenson .................... 62/180 |
| 4,279,574 | A | | 7/1981 | Kunderman |
| 4,365,663 | A | * | 12/1982 | Inoue et al. ................... 165/202 |
| 4,420,950 | A | | 12/1983 | Bodas et al. |
| 4,734,012 | A | | 3/1988 | Dob et al. |
| 4,936,109 | A | | 6/1990 | Longardner |
| 5,271,248 | A | * | 12/1993 | Crowe ............................ 62/505 |
| 5,284,202 | A | | 2/1994 | Dickey et al. |
| 5,386,873 | A | * | 2/1995 | Harden et al. ................. 165/47 |
| 5,570,738 | A | * | 11/1996 | Christensen ................... 165/67 |
| 5,718,563 | A | | 2/1998 | Hutchinson |
| 5,894,881 | A | | 4/1999 | Wagner et al. |
| 6,167,712 | B1 | * | 1/2001 | Lim et al. ...................... 62/113 |
| 6,189,604 | B1 | * | 2/2001 | Yamauchi et al. ............ 165/140 |
| 6,272,880 | B1 | * | 8/2001 | Miki et al. ..................... 62/404 |
| 6,283,749 | B1 | * | 9/2001 | Bernard et al. ................ 432/242 |
| 6,499,960 | B2 | | 12/2002 | Chen |
| 6,619,379 | B1 | | 9/2003 | Ambros et al. |
| 6,695,046 | B1 | | 2/2004 | Byrnes et al. |
| 6,695,047 | B2 | | 2/2004 | Brocksopp |
| 6,695,591 | B2 | | 2/2004 | Grimmer et al. |
| 2001/0013404 | A1 | * | 8/2001 | Lagace et al. .................. 165/8 |
| 2004/0031277 | A1 | * | 2/2004 | Hirose et al. .................. 62/186 |
| 2005/0138942 | A1 | * | 6/2005 | Grimm et al. ................. 62/180 |
| 2008/0219836 | A1 | * | 9/2008 | Decker et al. ................. 415/177 |
| 2009/0017206 | A1 | * | 1/2009 | Clark et al. ................... 427/248.1 |

OTHER PUBLICATIONS

Oxford English Dictionary, Online Edition definition of engine printed Dec. 2, 2009 http://dictionary.oed.com/cgi/entry/50075332?query_type=word&queryword=engine&first=1&max_to_show=10&sort_type=alpha&result_place=1&search_id=rYli-H20Coy-6174&hilite=50075332.*

Oxford English Dictionary, Online Edition Definition of radiator printed Dec. 17, 2009 http://dictionary.oed.com/cgi/entry/50196098?query_type=word&queryword=radiator&first=1&max_to_show=10&single=1&sort_type=alpha&case_id=qk11-FeNoRj-6194&p=1&d=1&sp=1&qt=1&ct=0&ad=1&print=1.*

* cited by examiner

VARIABLE SPEED AIR BLOWING SYSTEM

RELATED APPLICATION DATA

This application claims benefit under 35 U.S.C. Section 119(e) of U.S. Provisional Application No. 60/716,768 filed Sep. 13, 2005, which is fully incorporated herein by reference.

BACKGROUND

The present invention relates to a variable speed air blowing system for heat exchanging in a gas compression system. More particularly, the invention relates to a variable speed air blowing system for heat exchanging in a gas compression system that varies the speed of the blower in response to the operating conditions of the compression system.

Heat exchangers are often used in conjunction with air compressors to remove some of the heat of compression during operation. At times, it is useful to use multiple stages of air compressors to attain a higher pressure than would be possible with just one compressor. While not necessary, multi-stage compressors can operate more efficiently if inter-stage cooling is employed.

Isothermal compression of gasses represents the thermodynamic cycle with the greatest efficiency, (i.e. the highest possible ratio of the actual work to the theoretical work of compression required for a selected process). Isothermal compression occurs when the temperature of the gas is kept constant as the pressure increases. The theoretical isothermal cycle of compression requires continuous removal of heat as the pressure of the gas increases. Practically, the isothermal cycle of compression is approximated with a sequence of stages of compression each followed by a stage of inter-stage cooling.

During operation, parameters of the system such as temperatures and pressures may vary in a way that reduces the efficiency of the system or one or more compressors within the system.

SUMMARY

In one embodiment, the invention provides a fluid compression system that includes a compressor unit that directs a flow of compressed fluid to a first heat exchanger. A second heat exchanger receives a flow of coolant. A blower produces a flow of ambient air that passes through the first heat exchanger and the second heat exchanger so as to direct cooling air through both heat exchangers. A variable speed motor is coupled to the blower and to a control system to vary the motor speed between a low speed and a high speed.

In another embodiment the invention provides a fluid compression system that includes a plurality of heat exchangers each of which have an inlet and an outlet, a flow of compressed air from at least one compressor flows into a first inlet, and discharging air can flow out a last outlet. A blower drives air through said heat exchanger and sensors measure the temperature at the inlets and outlets. A variable speed motor which is directly coupled to the blower is employed to drive the blower, which in turn, moves air through the heat exchanger, at least partially in response to a temperature measured by the sensor.

In yet another embodiment the invention provides a fluid compression system including a first compressor stage which draws in ambient fluid and discharges a flow of compressed fluid at a first pressure. A second compressor stage receives the flow of compressed fluid and discharges the flow of compressed fluid at a second temperature and a second pressure which is greater than the first pressure. A first heat exchanger is positioned between the first compressor stage and the second compressor stage and cools the flow of compressed fluid. A flow of coolant cools at least one of the first and second compressor stages. A second heat exchanger receives the flow of coolant at a first coolant temperature and discharges the flow of coolant a second coolant temperature that is lower than the first temperature. A sensor measures a temperature of the ambient fluid and a blower produces a flow of ambient fluid that passes through the first heat exchanger and the second heat exchanger. The blower speed is variable between a low speed and a high speed in response to the measured ambient fluid temperature.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
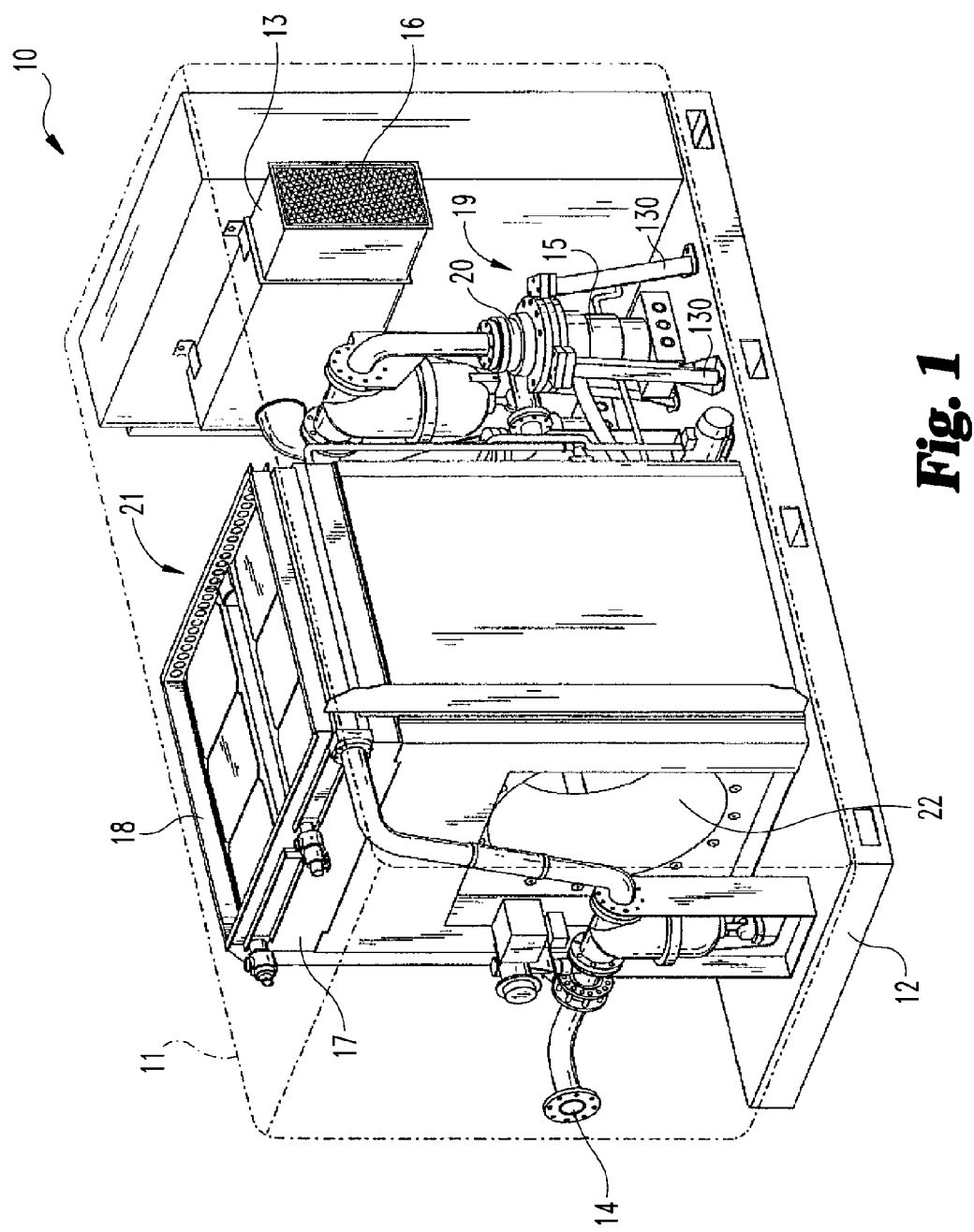
FIG. 1 is a perspective view of a compression system embodying the invention.

FIG. 1 illustrates a fluid compression system 10 that includes an enclosure 11 and a baseplate 12. An air intake 13 provides air flow into the enclosure 11 and an air discharge 14 provides an outlet from the enclosure. An air filter 16 is included on the intake 13 to remove outside debris from the air as it enters the system 10. A compression system 19 is disposed between the intake 13 and the air discharge 14.

The fluid compression system 10 further includes a first heat exchanger 17, which can be an air-to-liquid heat exchanger, and a second heat exchanger 18, which can be an air-to-gas heat exchanger. A blower system 21 is positioned beneath the heat exchangers 17, 18 and includes a blower inlet 22 positioned to draw air from within the enclosure 11 into the blower system 21 and discharge that air through the two heat exchangers 17, 18 and out of the enclosure 11, as will be discussed below.

Figure 2:
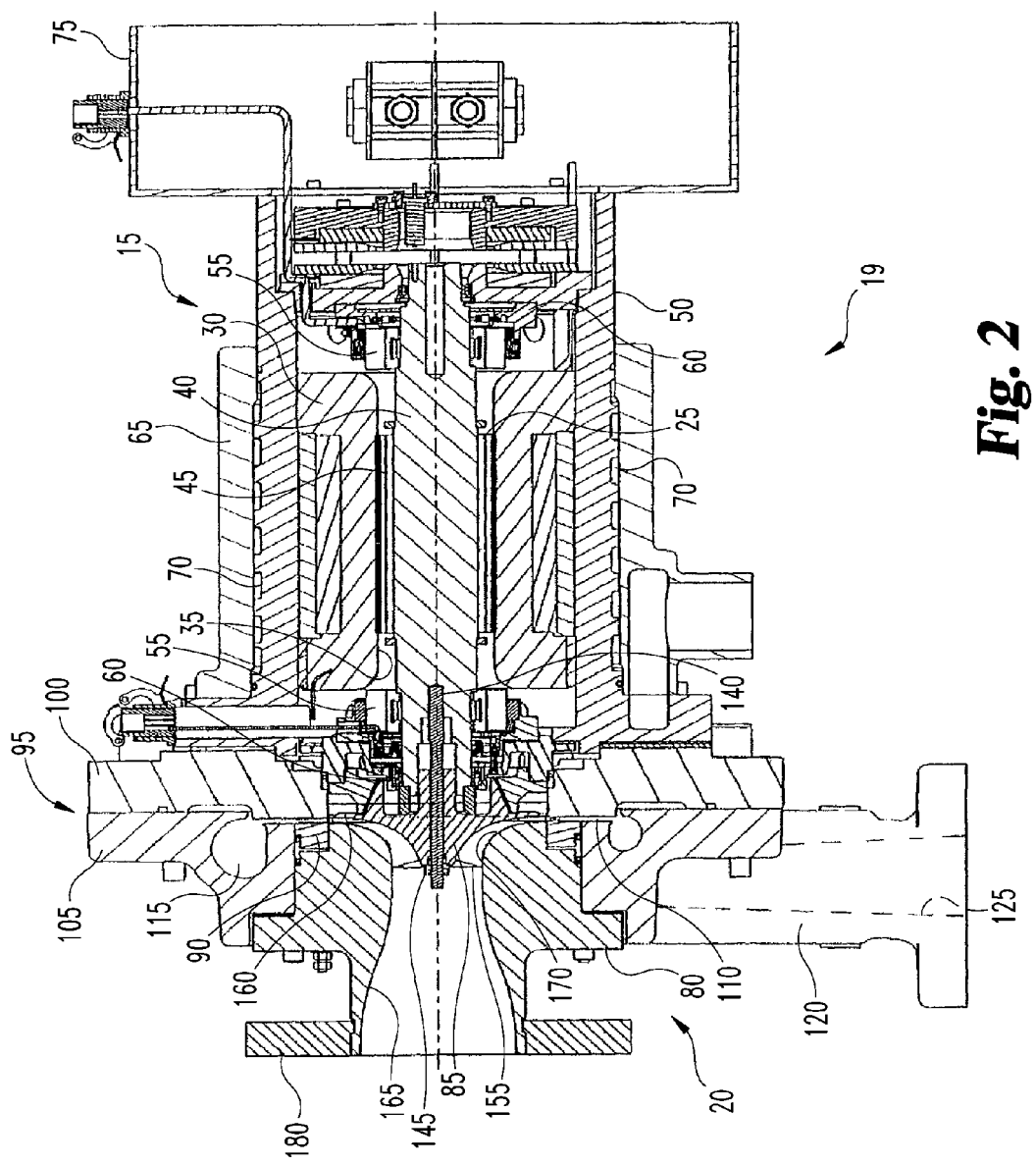
FIG. 2 is a cross-sectional view of a compressor and motor of the compression system of FIG. 1.

FIG. 2 illustrates the compression system 19 as including a prime mover, such as a motor 15 coupled to a compressor 20 and operable to produce a compressed fluid. In the illustrated construction, an electric motor 15 is employed as the prime mover. However, other constructions may employ other prime movers such as but not limited to internal combustion engines, diesel engines, combustion turbines, etc.

The electric motor 15 includes a rotor 25 and a stator 30 that defines a stator bore 35. The rotor 25 is supported for rotation on a shaft 40 and is positioned substantially within the stator bore 35. The illustrated rotor 25 includes permanent magnets 45 that interact with a magnetic field produced by the stator 30 to produce rotation of the rotor 25 and the shaft 40. The magnetic field of the stator 30 can be varied to vary the speed of rotation of the shaft 40. Of course, other constructions may employ other types of electric motors (e.g., synchronous, induction, brushed DC motors, etc.) if desired.

The motor 15 is positioned within a housing 50 which provides both support and protection for the motor 15. A bearing 55 is positioned on either end of the housing 50 and is directly or indirectly supported by the housing 50. The bearings 55 in turn support the shaft 40 for rotation. In the illustrated construction, magnetic bearings 55 are employed with other bearings (e.g., roller, ball, needle, etc.) also suitable for use. In the construction illustrated in FIG. 1, secondary bearings 60 are employed to provide shaft support in the event one or both of the magnetic bearings 55 fail.

In some constructions, an outer jacket 65 surrounds a portion of the housing 50 and defines cooling paths 70 therebetween. A liquid (e.g., glycol, refrigerant, etc.) or gas (e.g., air, carbon dioxide, etc.) coolant flows through the cooling paths 70 to cool the motor 15 during operation.

An electrical cabinet 75 may be positioned at one end of the housing 50 to enclose various items such as a motor controller, breakers, switches, and the like. The motor shaft 40 extends beyond the opposite end of the housing 50 to allow the shaft to be coupled to the compressor 20.

The compressor 20 includes an intake housing 80 or intake ring, an impeller 85, a diffuser 90, and a volute 95. The volute 95 includes a first portion 100 and a second portion 105. The first portion 100 attaches to the housing 50 to couple the stationary portion of the compressor 20 to the stationary portion of the motor 15. The second portion 105 attaches to the first portion 100 to define an inlet channel 110 and a collecting channel 115. The second portion 105 also defines a discharge portion 120 that includes a discharge channel 125 that is in fluid communication with the collecting channel 115 to discharge the compressed fluid from the compressor 20.

In the construction illustrated in FIG. 1, the compression system 19 includes legs 130 that provide support for the compressor 20 and the motor 15. In other constructions, other components are used to support the compressor 20 and the motor 15 in the horizontal position, a vertical orientation, or any other desired orientation.

The diffuser 90 is positioned radially inward of the collecting channel 115 such that fluid flowing from the impeller 85 must pass through the diffuser 90 before entering the volute 95. The diffuser 90 includes aerodynamic surfaces 135 (e.g., blades, vanes, fins, etc.), shown in FIG. 3, arranged to reduce the flow velocity and increase the pressure of the fluid as it passes through the diffuser 90.

The impeller 85 is coupled to the rotor shaft 40 such that the impeller 85 rotates with the motor rotor 25. In the illustrated construction, a rod 140 threadably engages the shaft 40 and a nut 145 threadably engages the rod 140 to fixedly attach the impeller 85 to the shaft 40. The impeller 85 extends beyond the bearing 55 that supports the motor shaft 40 and, as such is supported in a cantilever fashion. Other constructions may employ other attachment schemes to attach the impeller 85 to the shaft 40 and other support schemes to support the impeller 85. As such, the invention should not be limited to the construction illustrated in FIG. 1. Furthermore, while the illustrated construction includes a motor 15 that is directly coupled to the impeller 85, other constructions may employ a speed increaser such as a gear box to allow the motor 15 to operate at a lower speed than the impeller 85.

The impeller 85 includes a plurality of aerodynamic surfaces or blades 150 that are arranged to define an inducer portion 155 and an exducer portion 160. The inducer portion 155 is positioned at a first end of the impeller 85 and is operable to draw fluid into the impeller 85 in a substantially axial direction. The blades 150 accelerate the fluid and direct it toward the exducer portion 160 located near the opposite end of the impeller 85. The fluid is discharged from the exducer portion 160 in at least partially radial directions that extend 360 degrees around the impeller 85.

The intake housing 80, sometimes referred to as the intake ring, is connected to the volute 95 and includes a flow passage 165 that leads to the impeller 85. Fluid to be compressed is drawn by the impeller 85 down the flow passage 165 and into the inducer portion 155 of the impeller 85. The flow passage 165 includes an impeller interface portion 170 that is positioned near the blades 150 of the impeller 85 to reduce leakage of fluid over the top of the blades 150. Thus, the impeller 85 and the intake housing 80 cooperate to define a plurality of substantially closed flow passages 175.

In the illustrated construction, the intake housing 80 also includes a flange 180 that facilitates the attachment of a pipe or other flow conducting or holding component. For example, a filter assembly could be connected to the flange 180 and employed to filter the fluid to be compressed before it is directed to the impeller 85. A pipe would lead from the filter assembly to the flange 180 to substantially seal the system after the filter and inhibit the entry of unwanted fluids or contaminates.

Figure 3:
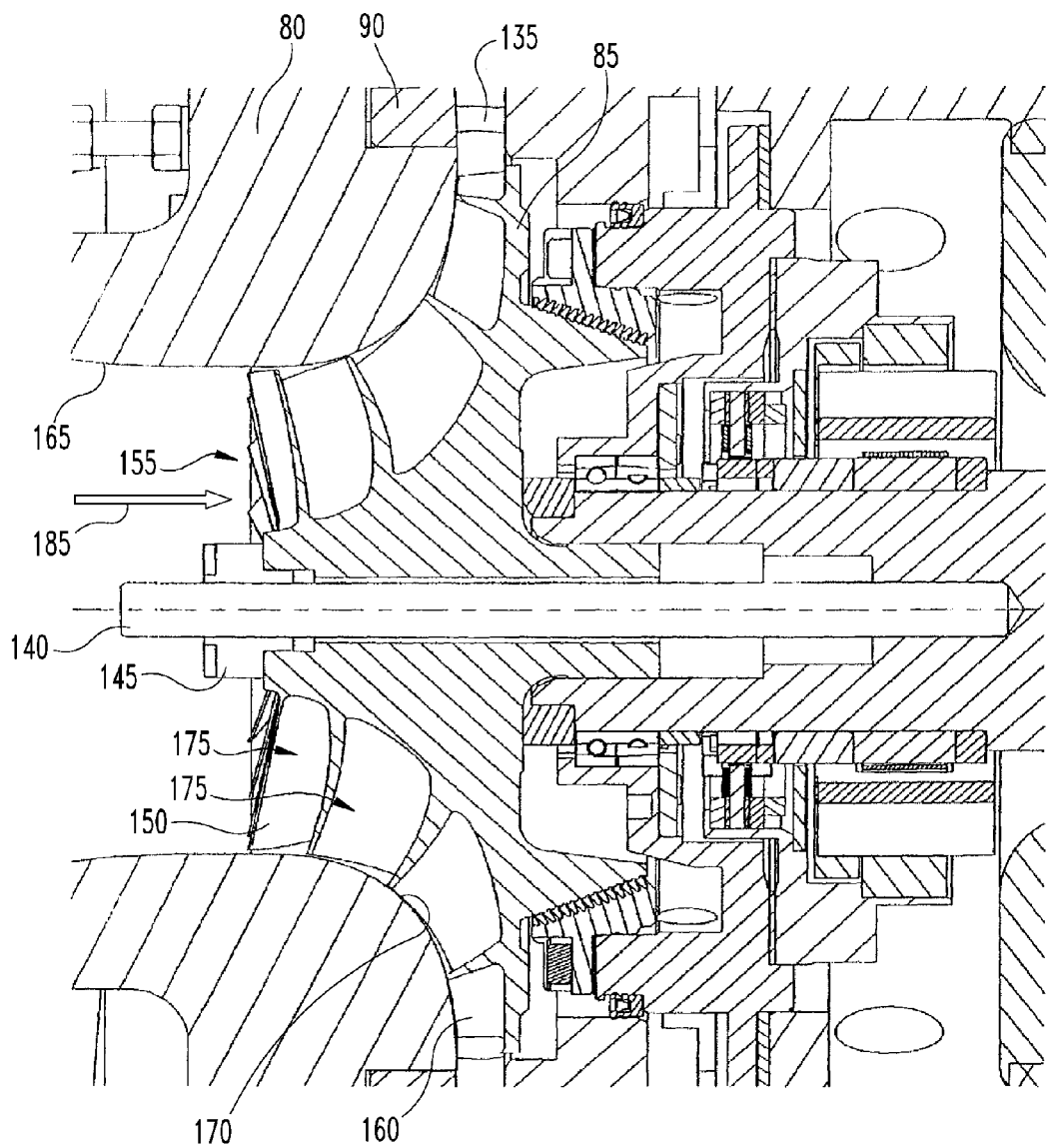
FIG. 3 is a cross-section view of a portion of the compressor of FIG. 2

As is better illustrated in FIG. 3, the inducer portion 155 is substantially annular and draws fluid along an intake path 185 into the impeller 85. The fluid enters in a substantially axial direction and flows through the passages 175 defined between adjacent blades 150 to the exducer portion 160.

Figure 4:
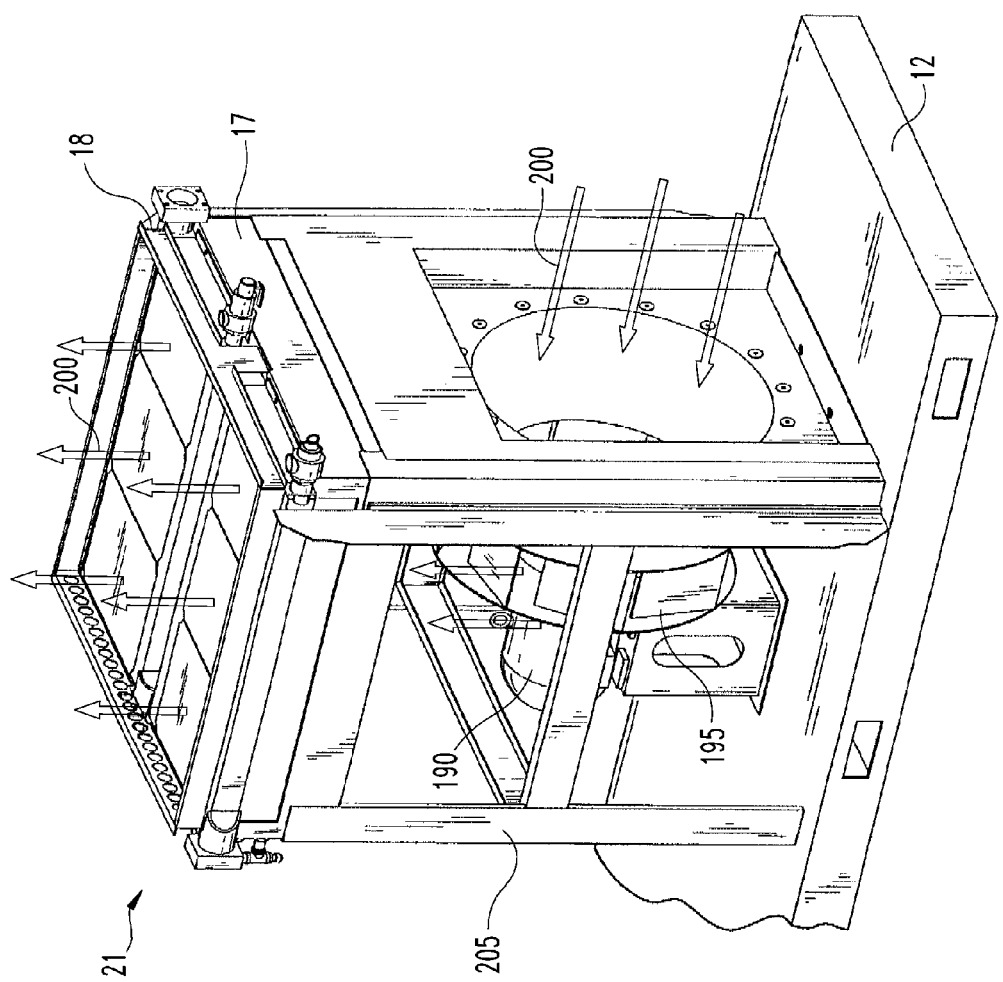
FIG. 4 is a perspective view of a portion of the system of FIG. 1 including flow direction arrows.

Turning to FIG. 4 the portion of the system 10 including the blower system 21, the first heat exchanger 17, and the second heat exchanger 18 is illustrated in greater detail. The blower system 21 includes a second motor 190 that is coupled, either directly or indirectly (e.g., gears, belts, etc.) to a blower 195. The blower 195 is preferably a centrifugal air blower that includes a plurality of vanes that produce a flow of fluid 200 in response to rotation. Of course other constructions may employ other fluid moving components. The blower 195 is positioned adjacent the inlet 22 to allow the blower 195 to draw in air from within the enclosure 11 in response to rotation. The blower 195 changes the air flow direction and discharges the flow of cooling fluid 200 from an outlet and in the direction of the heat exchangers 17, 18.

The first heat exchanger 17 is positioned adjacent the outlet of the blower 195 and is supported by a support frame 205. In a preferred construction, the first heat exchanger 17 is a finned-tube heat exchanger that receives a flow of coolant 210 that cools the compressor motor 25 and/or the blower motor 190. The tubes enhance the heat exchange efficiency between the air that is blown through the first heat exchanger 17 by the blower 195 and the coolant within the tubes. Of course, other types of heat exchangers (e.g., shell-tube, plate-fin, etc.) could be employed if desired.

In the illustrated construction, the support frame 205 includes a plurality of beam elements that are welded or otherwise attached to one another to support the heat exchanger 17 adjacent the blower system 21. Of course, other constructions could be employed so long as they are capable of supporting the weight of the heat exchangers 17, 18.

The second heat exchanger 18 is positioned directly adjacent the first heat exchanger 17 such that air from the blower 195 passes through the first heat exchanger 17 and then passes through the second heat exchanger 18. In a preferred construction, the second heat exchanger 18 is a finned-tube heat exchanger that receives the flow of compressed air from the compressor 20. The tubes enhance the heat exchange efficiency between the air that is blown through the second heat exchanger 18 by the blower 195 and the air, or other gas, within the tubes. Of course, other types of heat exchangers (e.g., shell-tube, plate-fin, etc.) could be employed if desired.

While the illustrated construction positions both the heat exchangers 17, 18 above the blower system 21, other constructions may position the heat exchangers 17, 18 next to the blower 195 and arrange the blower 195 to direct the outlet air in a sideways direction. In still other constructions, the heat exchangers 17, 18 are positioned in parallel (i.e., side-by-side) rather than in series. Thus, the invention should not be limited to the arrangement illustrated herein.

Figure 5:
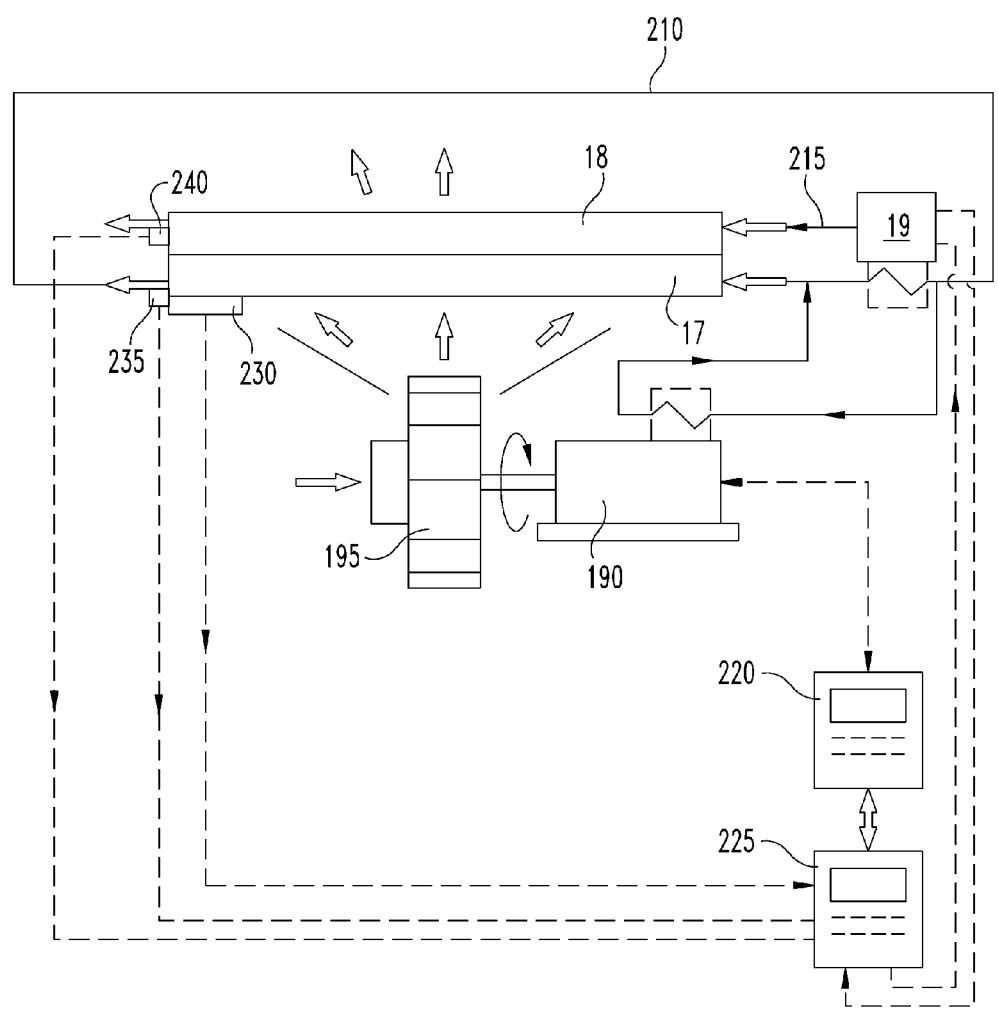
FIG. 5 is a schematic illustration of the gas compression system of FIG. 1.

FIG. 5 schematic illustrates the flow of the various fluids through the fluid compression system 10. The compressor system 19 produces a flow of compressed fluid 215, such as air, that is directed through the second heat exchanger 18. After passing through the heat exchanger, the compressed fluid 215 may flow to a point-of-use, another compression system, or another desired location. The flow of coolant 210 flows along a coolant loop that includes the first heat exchanger 17. After passing through the first heat exchanger 17, the flow of coolant 210 cools a portion of the compressor system 19 and may also cool the blower motor 190 or other system components. After cooling the various components, the coolant flows back to the heat exchanger 17 for cooling.

A first controller 220 is connected to the blower motor 190 and is operable to control the speed of the blower motor 190 in response to control signals from a second controller 225. The second controller 225 receives signals from the compressor system 19 and from a first sensor 230 (e.g., thermocouple) positioned to measure the ambient temperature of the air within the enclosure 11. In addition, a second sensor 235 is positioned to measure the outlet temperature of the first heat exchanger 17, and a third sensor 240 is positioned to measure the outlet temperature of the second heat exchanger 18. The second controller 225 uses these signals to generate the control signal for the first controller 220 and also to generate control signals for the compressor system 19.

In a preferred construction, the second controller 225 is a programmable logic controller. The controller 225 is connected to the compression system 19 via connection 200. The second controller 225 has information concerning compressed gas temperatures and pressures, positions of valves, stability margin of the compressor 20 with respect to surge, requirements of the system upstream the compressor 20, ambient temperature and pressure, and performance parameters of the auxiliary systems. The first controller 220 is linked to the second controller 225, that based on some or all of the information received from the first controller 220, can provide regulation and monitoring of the rotational speed of the blower motor 190.

Figure 6:
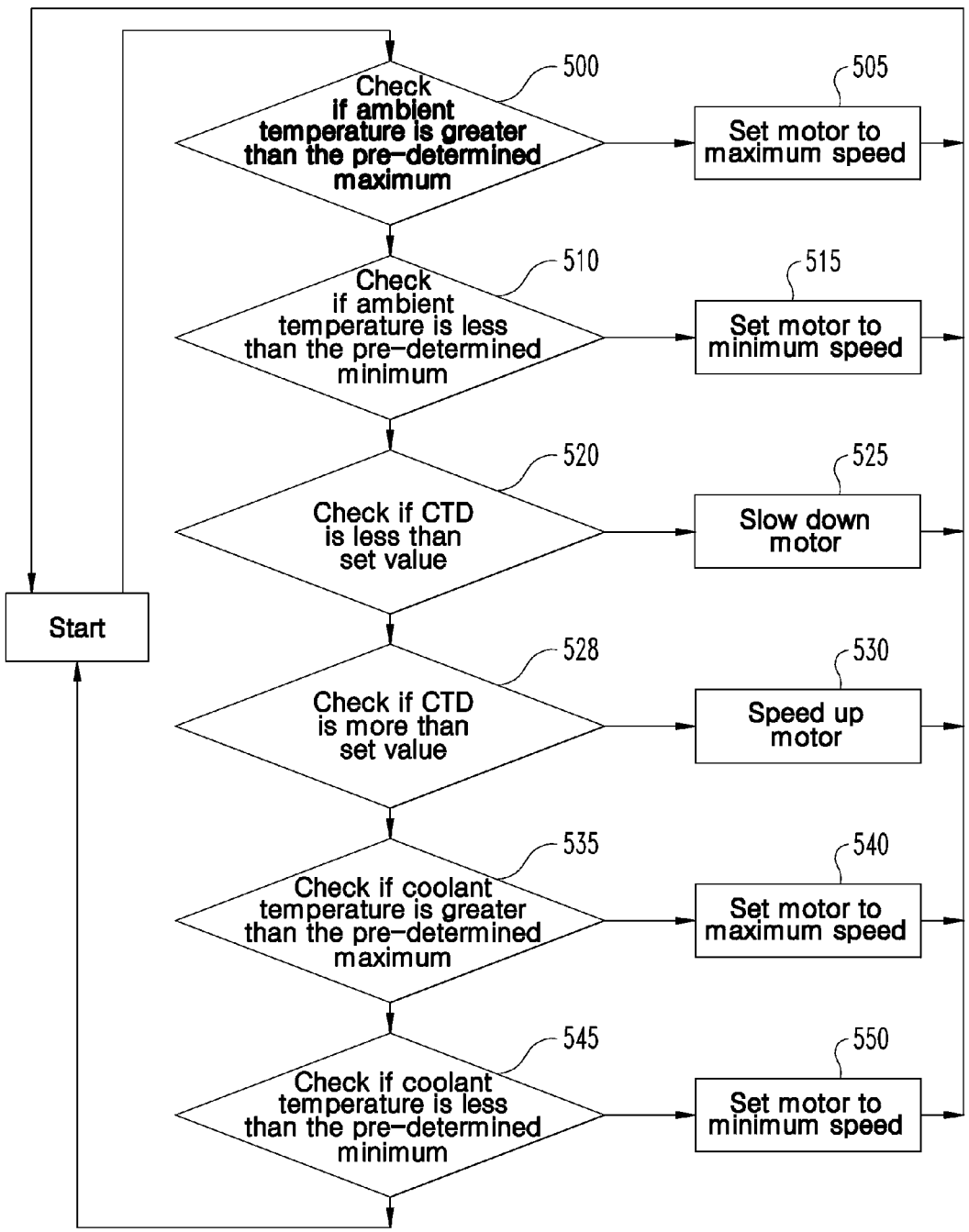
FIG. 6 is a flow chart illustrating a control logic algorithm suitable for use compression system of FIG. 1.

FIG. 6 is a block diagram illustrating a portion of an algorithm that may be employed to control the operation of the blower motor 190. In the algorithm, the measured ambient temperature is compared to a predetermined maximum at block 500. The predetermined maximum is not an absolute maximum. Rather, it is a high temperature of the ambient air above which the blower operates at its highest efficient speed to provide the desired cooling, sometimes referred to as the motor maximum speed. Thus, if the ambient air temperature is above the predetermined maximum, the controller 220, 225 sets the motor speed at a maximum as shown at block 505. The controller 220, 225 also compares the ambient temperature to a predetermined minimum temperature at block 510. As with the maximum temperature, the minimum temperature is not the lowest possible temperature. Rather, it is a temperature at which the blower 195 can operate at its lowest controllable speed (above zero) and still achieve the desired cooling. If the ambient temperature is at or below the minimum temperature, the controller 220, 225 sets the blower motor speed at its minimum speed, as shown at block 515.

The controller 220, 225 calculates a cold temperature difference (CTD) that is based on the measured ambient temperature and the air output temperature measured by the third sensor 240. Generally, the air output temperature is measured at the outlet of the second heat exchanger 18. However, multi-stage systems may measure the outlet temperature at the outlet of the final inter-stage cooling stage or at another point. The controller 220, 225 uses the CTD value to control the speed of the blower motor 190 when the ambient air temperature is between the minimum and maximum temperatures. As shown at block 520, the controller 220, 225 compares the CTD to a predetermined set point value (set value). If the CTD is less than the set point value, the controller 220, 225 sends a signal to the blower motor 190 to slow the motor 190 as shown at block 525. If the CTD is greater than the set point value, the controller 220, 225 sends a signal to the blower motor 190 to increase the motor speed, as shown at block 530. As one of ordinary skill in the art will realize, the set point value may actually be a range. When a range is employed, the controller 220, 225 is less likely to be constantly adjusting the speed of the blower motor 190 in response to small temperature changes.

The controller 220, 225 also monitors the temperature of the coolant that exits the first heat exchanger as measured by the second sensor 235. The controller 220, 225 adjusts the blower motor 190 in response to the monitored coolant temperature. At block 535, the controller 220, 225 checks if the coolant temperature is above a predetermined coolant maximum. As with the maximum air temperature, the maximum coolant temperature is not a maximum possible temperature but rather is a temperature at which the full speed of the blower motor 190 is needed to move the quantity of cooling air through the heat exchanger 17 to achieve the desired cooling. As such, if the coolant temperature is greater than the predetermined maximum coolant temperatures, the controller 220, 225 sends a signal to the blower motor 190 that results in operation of the blower motor 190 at its highest efficient speed, as shown at block 540. The controller 220, 225 also checks if the coolant temperature is below a predetermined minimum at block 545. As with the minimum air temperature, the minimum coolant temperature is not a minimum possible temperature. Rather, it is a temperature below which little or no cooling of the coolant is required and the blower motor 190 can be run at its lowest controllable speed. Thus, if the controller 220, 225 determines that the coolant temperature is below the minimum coolant temperature, the controller 220, 225 sends a signal to the blower motor 190 to reduce the blower motor speed to the minimum, as shown at block 550.

In operation, the motor 15 drives the compressor 20 to produce the flow of compressed fluid 215, often air. The speed of the motor 15 is controlled by the controller 225 and can be based on several parameters including output pressure, flow rate, volume of fluid, and the like. The compressed fluid exits the compressor 20 and passes through the second heat exchanger 18 before proceeding to another compressor, a point-of-use, or other location. During operation of the compressor 20, coolant may pass through the compressor system 19 to cool various components (e.g., motor 15, controls, etc.). After the coolant cools the compressor system 19, the coolant is directed through the first heat exchanger 17 to be cooled.

Power is provided to the blower motor 190 to rotate the blower 195 at a desired speed. Operation of the blower 195 forces cooling air through the first heat exchanger 17 to cool the coolant and then through the second heat exchanger 18 to cool the compressed fluid. The fluid is then discharged from the enclosure 11.

The fluid compression system 10 monitors several temperatures including the outlet temperature of the first heat exchanger 17, the outlet temperature of the second heat exchanger 18, and the ambient temperature. The ambient temperature and the output temperature of the second heat exchanger 18 are used to calculate the cold temperature difference (CTD). The controller 220, 225 uses the measured temperatures and the calculated CTD value to control the speed of the blower motor 190.

Thus, the blower motor 190 and the compressor motor 15 are controlled substantially independently of one another. For example, if a sudden increase in the need for compressed fluid occurs, the compressor motor 15 will accelerate to a higher speed to supply the demand. The extra power consumed by the compressor motor 15 will produce more heat. A portion of this heat will pass to the coolant before the coolant passes through the first heat exchanger 17. In addition, extra fluid will pass through the second heat exchanger 18. The additional heat in the coolant and additional mass in the second heat exchanger 18 will result in an increase in the output temperature at both heat exchangers 17, 18. The controller 220, 225 will sense a higher CTD temperature which will result in an increase in the rotational speed of the blower 195. The faster rotation of the blower 195 will move additional air through the heat exchangers 220, 225 to reduce both outlet temperatures. Thus, the blower motor 195 reacts to changes in the compression system 10.

Variations in the ambient temperature result in changes in efficiency of the heat exchanger 17, 18 absent another change (i.e., an increase or decrease in the cooling air flow rate). For example, colder gas temperatures, with all other operating parameters being constant, increase the maximum pressure ratio and capacity of the compressor 20 and consequently the compressor flow throttling range at constant discharge pressure. An increase in the maximum stable pressure ratio of the compressor 20 results, for a given value of the pressure of the gas at the intake of the compressor 20, in a higher maximum achievable discharge pressure or surge pressure. (The surge pressure represents the maximum value of the dynamic compressor discharge pressure; beyond the surge pressure, the operation of the compressor 20 becomes unstable, and the compressor 20 experiences abnormal vibration, a characteristic noise and rapid variations in power.) Thus, a greater range in compressed flow regulation would be possible by properly adjusting the amount of compression generated heat that can be removed by changing the rotational speed of the centrifugal air blower 195.

In relatively cold air ambient conditions, the temperature of the fluid being cooled could be excessively low so as to induce excessive water condensation, carryover and moisture solidification problems and/or the freezing of the fluids being cooled. During operation in hot ambient conditions, or because of a deterioration of the heat exchanger 18 with use, the optimal CTD value may not be maintained. Thus, from the above discussion, it is evident that the rotational speed of the centrifugal blower 195 could be based on CTD within a certain range of ambient and operating temperatures of the compressed gas, and then augmented by contingent values of the ambient conditions and of the discharge temperatures of the fluids being cooled.

Other physical quantities, such as the pressure drop across the inter-stage heat exchanger 18 can be utilized to further refine the computation by the controllers 220, 225 of the optimal speed of the motor 190.

Various features and advantages of the invention are set forth in the following claims.

What is claimed is:

1. An air compression system comprising:
   a compressor unit operable to create a flow of compressed air;
   a first heat exchanger operable to receive the flow of compressed air at a first temperature and discharge the flow of compressed air at a second temperature;
   a flow of coolant;
   a second heat exchanger disposed adjacent the first heat exchanger and adapted to receive the flow of coolant at a first coolant temperature and discharge the flow of coolant at a second coolant temperature;
   a blower operable to produce a flow of ambient air that passes through the first heat exchanger and the second heat exchanger in series such that the second temperature is less than the first temperature and the second coolant temperature is less than the first coolant temperature;
   a variable speed motor coupled to the blower and operable at a motor speed; and
   a control system operable to vary the motor speed between a low speed and a high speed, wherein a first portion of the flow of coolant is directed to the variable speed motor to cool the variable speed motor and a second portion of the flow of coolant is directed to the compressor unit to cool the compressor unit.

2. The air compression system of claim 1, wherein the compressor unit includes a centrifugal compressor and a motor operable to drive the centrifugal compressor, the flow of coolant passing through the motor to cool the motor.

3. The air compression system of claim 1, wherein the blower is a centrifugal air blower.

4. The air compression system of claim 1, wherein the variable speed motor directly controls the speed of the blower in response to at least one of an ambient temperature, the second coolant temperature, and the second temperature.

5. The air compression system of claim 1, wherein the variable speed motor directly controls the speed of the blower in response to each of an ambient temperature, the second coolant temperature, and the second temperature.

6. The air compression system of claim 1, wherein the first heat exchanger is an inter-stage heat exchanger and is positioned downstream of the second heat exchanger.

7. The air compression system of claim 1, wherein the heat exchangers are in direct contact with one another.

8. The air compression system of claim 1, wherein the first heat exchanger cools a gas and the second heat exchanger cools a liquid.

9. A heat exchanger system comprising:
a first heat exchanger including an inlet and an outlet;
a compressor operable to produce a flow of compressed air, the flow of compressed air passing through the first heat exchanger;
a blower adapted to drive air through said first heat exchanger;
a first sensor positioned to measure an inlet temperature at the inlet;
a second sensor positioned to measure an outlet temperature at the outlet;
a variable speed motor operable between a first speed and a second speed to drive ambient air through the first heat exchanger; and
a controller operable in response to the measured outlet temperature to vary the speed of the motor between the first speed and the second speed independent of the compressor.

10. The heat exchanger system of claim 9, wherein the motor includes a coolant passage adapted to facilitate the passage of a flow of coolant to cool the motor.

11. The heat exchanger system of claim 10, further comprising a second heat exchanger, the second heat exchanger receiving the flow of coolant and positioned upstream of the first heat exchanger.

12. The heat exchanger system of claim 11, wherein the first heat exchanger and second heat exchanger are in direct contact with one another.

13. The heat exchanger system of claim 11, wherein the first heat exchanger cools a gas and the second heat exchanger cools a liquid.

14. The heat exchanger system of claim 10, wherein the variable speed motor directly controls the speed of the blower in response to each of an ambient temperature, a temperature of the flow of coolant, and the outlet temperature.

15. The heat exchanger system of claim 10, wherein the variable speed motor directly controls the speed of the blower in response to at least one of an ambient temperature, a temperature of the flow of coolant, and the outlet temperature.

16. The heat exchanger system of claim 9, wherein the blower is a centrifugal air blower.

17. An air compression system comprising:
a first compressor stage operable to draw in ambient air and discharge a flow of compressed air at a first pressure;
a second compressor stage operable to receive the flow of compressed air and discharge the flow of compressed air at a second temperature and a second pressure greater than the first pressure;
a first heat exchanger positioned between the first compressor stage and the second compressor stage and operable to cool the flow of compressed air;
a flow of coolant operable to cool at least one of the first compressor stage and the second compressor stage;
a second heat exchanger operable to receive the flow of coolant at a first coolant temperature and discharge the flow of coolant at a second coolant temperature that is lower than the first temperature;
a sensor positioned to measure a temperature of the ambient air;
a variable speed motor; and
a blower powered by the variable speed motor at a blower speed to produce a flow of ambient fluid that passes through the first heat exchanger and the second heat exchanger, the blower speed variable between a low speed and a high speed in response to the measured ambient fluid temperature and independent of the first compressor stage and the second compressor stage, wherein a portion of the flow of coolant is directed to the variable speed motor to cool the motor.

18. The air compression system of claim 17, wherein the variable speed motor directly controls the speed of the blower in response to each of the ambient temperature, the second coolant temperature, and the second temperature.

19. The air compression system of claim 17, wherein the second heat exchanger is positioned upstream of the first heat exchanger.

20. The air compression system of claim 17, wherein the first heat exchanger and second heat exchanger are in direct contact with one another.

21. The air compression system of claim 17, wherein the first heat exchanger cools a gas and the second heat exchanger cools a liquid.

* * * * *